United States Patent [19]
Agarwal et al.

[11] Patent Number: 4,517,250
[45] Date of Patent: May 14, 1985

[54] EMULSION TYPE ADHESIVE COMPOSITIONS

[75] Inventors: Pawan K. Agarwal, Westfield; Robert D. Lundberg, Bridgewater; Joseph Wagensomer, Westfield, all of N.J.; Frank C. Jagisch, Baton Rouge, La.

[73] Assignee: Exxon Research and Engineering Co., Florham Park, N.J.

[21] Appl. No.: 593,564

[22] Filed: Mar. 26, 1984

[51] Int. Cl.$^3$ ............................................. C08L 57/02
[52] U.S. Cl. .................................. 428/483; 428/508; 428/512; 428/517; 428/521; 524/499; 524/518
[58] Field of Search ...................... 524/814, 499, 518; 428/483, 508, 512, 517, 521

[56] References Cited

U.S. PATENT DOCUMENTS

| | | | |
|---|---|---|---|
| 3,839,243 | 10/1974 | Ruckel et al. | 524/518 |
| 3,931,087 | 1/1976 | Baatz et al. | 524/824 |
| 4,012,560 | 3/1977 | Baatz et al. | 524/814 |
| 4,338,229 | 7/1982 | Agarwal et al. | 524/499 |
| 4,370,432 | 1/1983 | Agarwal et al. | 524/518 |
| 4,373,056 | 2/1983 | Besecke et al. | 524/814 |
| 4,376,179 | 3/1983 | Agarwal et al. | 524/518 |
| 4,387,174 | 6/1983 | Lundberg et al. | 524/499 |

*Primary Examiner*—Lewis T. Jacobs
*Attorney, Agent, or Firm*—Richard E. Nanfeldt

[57] ABSTRACT

This invention relates to emulsion type adhesive compositions which include a metal neutralized copolymer, wherein the neutralized sulfonated copolymer has about 5 to about 250 meq. of neutralized sulfonate groups per 100 grams of the neutralized sulfonated copolymer, and less than about 200 parts by weight of a hydrocarbon resin of a petroleum or coal tar distillate, having about 5 to 6 carbon atoms, the hydrocarbon resin being composed of aliphatic dienes and monoolefins per 100 parts by weight of the neutralized sulfonated copolymer.

10 Claims, No Drawings

EMULSION TYPE ADHESIVE COMPOSITIONS

BACKGROUND OF THE INVENTION

1. Field of the Invention

This invention relates to emulsion type adhesive compositions which include a metal neutralized copolymer, wherein the neutralized sulfonated copolymer has about 5 to about 250 meq. of neutralized sulfonate groups per 100 grams of the neutralized sulfonated copolymer, and less than about 200 parts by weight of a hydrogen resin of a petroleum or coal tar distillate, having about 5 to 6 carbon atoms, the hydrocarbon resin being composed of aliphatic dienes and monoolefins per 100 parts by weight of the neutralized sulfonated copolymer.

Broadly speaking, synthetic adhesives used in packaging can be classified into four categories: water based emulsion system, solvent based, reactive and hot melt adhesives. Of these four, currently the water based are used most extensively. Usually the water based adhesives are based on emulsion polymers and are applied to porous cellulosic substrates. Energy from the outside in some fashion is applied to the system to evaporate the water in order that a strong bond may be formed.

With the solvent-based adhesives usually a good wetting is achieved; however, their use has been becoming extremely restrictive due to expensive energy requirements for the evaporation of organic solvents, fire hazards associated with the use of these organic solvents and emissions problems with said solvents. The strict government environmental regulations and restrictions concerning worker's exposure to solvent vapors, etc. has placed extra pressure on the packager to use non-solvent based adhesives.

The hot melt adhesives are generally applied (as the name implies) by conventional extrusion or coating techniques in the temperature range of 250° to 450° C. on one of the surfaces to be bonded. The other surface is brought in contact with the hot surface for a sufficient period of time for the melt to cool, where upon solidification, a strong and durable bond is formed.

2. Prior Art

Several U.S. patents have described sulfonated polymers such as sulfonated Butyl and sulfonated EPDM in adhesive applications (e.g., U.S. Pat. No. 3,867,247 and U.S. Pat. No. 3,801,531). It is important to distinguish the instant invention over those prior art systems. The former patent are directed at a sulfonated butyl cement or EPDM terpolymer which is solvent based and is employed to laminate various substrates. It is important to note that the instant invention differs dramatically from these patents as follows:

(a) The adhesives of the instant invention are not deposited from solvents, but are water based emulsions;

(b) The instant invention may optionally include either a tackifier resin and/or plasticizer capable of associating with the neutralized sulfonate groups, and thereby reducing the melt viscosity of the resulting blends to make the systems more processable;

(c) The instant invention is directed to metal neutralized sulfonated elastomeric copolymers, whereas most of the prior art deals with sulfonated Butyl rubber (e.g., U.S. Pat. No. 3,867,247).

SUMMARY OF THE INVENTION

This invention relates to emulsion type adhesive compositions which include a metal neutralized sulfonated elastomeric copolymer which has about 5 to about 250 meq. of neutralized sulfonate groups per 100 grams of the neutralized sulfonated copolymer and less than about 200 parts by weight of a hydrocarbon resin of a petroleum or coal tar distillate, having about 5 to about 6 carbon atoms, said hydrocarbon resin having aliphatic dienes and monoolefins therein per 100 parts by weight of the metal neutralized sulfonated elastomeric copolymer and optionally, about 1 to 50 parts of a preferential plasticizer per 100 parts of the metal neutralized sulfonated elastomeric copolymer can be added to the composition.

GENERAL DESCRIPTION

The present invention relates to unique and novel emulsion type adhesive compositions which comprise a mixture of a metal neutralized sulfonated elastomeric copolymer and a hydrocarbon resin, wherein to the compositions can be optionally added an ionic preferential plasticizer, oil, and/or a filler, thereby modifying the properties of the emulsion type adhesive compositions.

SULFONATED POLYMER AND PROCESS FOR FORMING

The solid elastomeric copolymer of the instant invention comprise at least 80% by weight of at least one conjugated diene having from 4 to 12 carbon atoms or at least 80% by weight of a combination of at least one conjugated diene and styrene, wherein the combination contains less than 50 weight percent of styrene of the total 80 weight percent and a minor proportion of a monomer characterized by the formula:

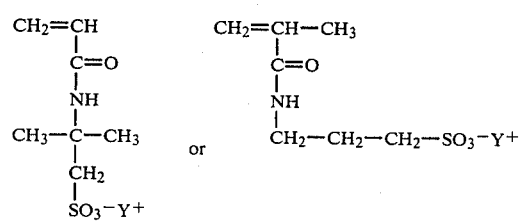

wherein Y is a cation selected from Groups IA, IIA, IB and IIB of the Periodic Table.

The copolymer is water insoluble having at least 0.5 weight percent sulfur to less than about 5 weight percent sulfur chemically combined.

The instant invention relates to the formation of emulsions of sulfonate containing copolymers which are formed by a free radical copolymerization process. The monomers used in the free radical emulsion copolymerization processes are conjugated dienes which are copolymerized with sulfonate containing monomers.

In general, the conjugated diene and sulfonate containing monomer are dispersed in a water phase in the presence of a water soluble initiator or a redox system which has one component soluble in the oil phase and one component soluble in the water phase, and either with or without surfactant, wherein the temperature is sufficient to initiate polymerization. To the resultant latex is added a tackifier resin and the emulsion is doctor bladed onto a substrate and dried at room or elevated temperatures to form the adhesive film.

The copolymers formed from the free radical emulsion copolymerization process of the instant invention can be generally described as having an $M_n$ as measured by GPC of about 5,000 to about 200,000, more preferably about 10,000 to about 100,000. The copolymers of the instant invention contain about 0.5 to about 5 weight percent of the chemically combined sulfur, more preferably about 0.6 to about 3, and most preferably about 0.7 to about 2.0 weight percent sulfur. The copolymers of the instant invention are water insoluble, substantially gel free, thermally stable and oxidatively stable. Typically, the copolymerization of any conjugated diene as so defined herein, can be readily copolymerized with the sulfonate containing monomer as is defined herein. Terpolymers with styrene, acrylonitrile, vinyl chloride, as the termonomers with the aforementioned dienes, are also contemplated provided that no more than 10 weight percent of the termonomer is combined therein.

CONJUGATED DIENES

The conjugated dienes of the instant invention are generally defined as acyclic conjugated dienes containing from about 4 to about 10 carbon atoms more preferably about 4 to about 6 carbon atoms. Typical, but non-limiting examples of acyclic conjugated dienes are 1,3-butadiene, isoprene (2-methyl-1,3-butadiene), 2,3-dimethyl, 1,3-pentadiene, 2-methyl-1,3-pentadiene, 2,3-dimethyl-1,3-pentadiene, 3-methyl-1,3-pentadiene, 2-phenyl butadiene, chloroprene and piperidene. Typical, but non-limiting examples of cyclic conjugated dienes are cyclopentadiene and methyl cyclopentadiene. The preferred conjugated dienes of the instant invention are selected from the group consisting of 1,3-butadiene, isoprene and chloroprene. In the formation of the sulfonate containing copolymer, one copolmerizes one of the aforementioned conjugated dienes with the sulfonate containing monomer. Sulfonate containing terpolymers can be readily formed by copolymerizing the sulfonate containing monomer with a mixture of two of the above identified conjugated dienes.

SULFONATE CONTAINING MONOMERS

The sulfonate containing monomers of the instant invention which are water soluble can be generally described as a monomer having unsaturation and a metal or amine sulfonate group. The metal or amine neutralized sulfonate monomer is characterized by the formula:

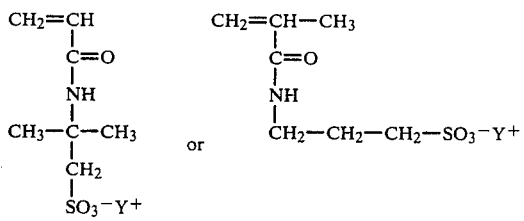

wherein Y is a cation selected from Groups IA, IIA, IB, and IIB of the Periodic Table.

The molar ratio of sulfonate containing monomer to conjugated diene is about 1/200 to about 1/5, more preferably about 1/150 to about 1/6, and most preferably about 1/100 to about 1/9. Either a water soluble, free radical initiator such as potassuim persulfate, ammonium persulfate, water soluble redox couples such as potassium persulfate, sodium metabisulfite or oil soluble, water soluble redox couples such as diisopropyl benzene hydroperoxide, triethylenetetramine are effective in initiating these copolymerizations. The water soluble inorganic systems are preferred because of an apparent reduction of side reactions with the resulting unsaturated polymer.

The surfactants employed for this invention are varied and well-known in the art. The typical emulsifiers or surfactants can be employed, however, some are more effective than others in generating latexes of better stability. A preferred emulsifier is sodium lauryl sulfate. This copolymerization can also be conducted without emulsifier because of the surfactancy of the sulfonate monomer.

Buffering agents can be employed in the instant polymerization process and are selected from the group consisting of sodium carbonate, ammonia, sodium acetate, trisodium, phosphate etc. When utilized, these buffering agents are employed at a concentration of about 0.1 to about 5 grams per 100 grams water employed in the emulsion system.

Chain transfer agents can be readily employed in the instant polymerization process for controlling the molecular weight of the resultant copolymer. The concentration of chain transfer agent is from 0 to about 1.0 grams per 100 grams of the combined weight of the sulfonate containing monomer and the conjugated diene.

The free radical emulsion copolymerization of the water soluble sulfonate containing monomer and the conjugated diene yields a stable latex, wherein the resultant water insoluble copolymer is not covalently cross-linked and possesses substantial ionic crosslinking, and has about 0.5 to about 5 weight percent of chemically combined sulfur, more preferably about 0.6 to about 3. To the resultant latex is added the tackifier resin to form the emulsion type adhesive composition.

COMMERCIAL TACKIFIER RESINS

To the emulsion of the metal neutralized sulfonated elastomeric copolymer is added a commercial tackifying resin having a softening point of about 0° C. to about 160° C., more preferably about 50° C. to about 140° C. and most preferably about 70° C. to 120° C. A variety of commercial tackifier resins are available. Some of these resins contain α and/or β pinene or rosin derivatives as the base ingredient, while others are derived from the polymerization of petroleum or coal distillates which consist of aliphatic dienes, mono and diolefins and cyclic olefins having about 5 to about 6 carbon atoms. The latter type of tackifiers have primarily piperyline and/or isoprene structure. A general but excellent description of tackifying resins derived from petroleum derivatives can be found in, for example, *Encyclopedia of Polymer Science and Technology,* Vol. 9, pages 853 to 860, chapter by John Findlay, published by John Wiley & Sons, NY (1968).

Typical but non-limiting tradenames of these commercial tackifiers are Wingtack of Goodyear, Escorez of Exxon, Piccolyte of Hercules and Zonarez of Arizona Chemicals. Recently, these and various other companies have also started marketing relatively higher softening point resins. These are generally modified aliphatic hydrocarbon resins and/or hydrogenated polycyclics. The physical appearance of these commercial tackifying resins varies, depending upon their softening point, they can be either viscous liquids or light-colored solids at room temperature. Most often, their initial color (Gardner) is about 3.0 to about 7.0 and the density from about 0.7 to 1.0 gm/cm³ at room temperature. The acid number of these resins is usually less than 1. In general, the molecular weight of these commercial tackifying resins is not homogenous, the number average molecular weight $M_n$, as measured by GPC, can be from about 300 to about 5000, and more preferably about 500 to about 2000, and most preferably about 700 to 1600.

As well-known to those familar with the use of tackifying resins, because of their wide range compatability, any of them can be used with sulfonated polymers in proper formulation, which will yield adhesive systems of varying physical characteristics. To cite an example in the present invention, the tackifying resins used are those based on hydrocarbon resins.

These hydrocarbon tackifier resins are incorporated into the emulsion type adhesive composition at about 25 to about 700 parts by weight per 100 parts by weight of the metal neutralized sulfonated elastomeric copolymer, more preferably about 50 to about 500, and most preferably about 75 to about 300.

In forming the emulsion type adhesive composition of the metal neutralized sulfonated elastomeric copolymer, the tackifier resin is dissolved in a hydrocarbon solvent such as toluene at a concentration level of about 20 to about 70 grams per 100 ml. of solvent, for example 50 grams. The solution of tackifier resin is added to the emulsion of the metal neutralized sulfonated elastomeric copolymer and vigorously mixed to form the emulsion type adhesive composition.

METHOD OF APPLICATION

The emulsion of the neutralized sulfonated elastomeric copolymer is doctor bladed to the required thickness onto a substrate and the formed adhesive film is dried at room temperature or elevated temperature either under vacuum or at atmospheric pressure for a sufficient period of time in order to remove the water from the adhesive film.

Most preferably the drying or fusion temperature of the emulsion layer of the neutralized sulfonated elastomeric copolymer and the hydrocarbon tackifying resin is about 50° to about 250° C. and the time of drying or fusion is about 10 seconds to 10 minutes, wherein the drying or fusion is preferably conducted at the temperature of greater than 50° C. for at least 30 seconds. The thickness of the adhesive layer formed by the drying or fusion of the emulsion layer of the neutralized sulfonated elastomeric copolymer and the hydrocarbon tackifying resin is about 0.1 mil. to 10 mil. Typical substrates, upon which the emulsion layer can be deposited on one or both of the surfaces of the substrate to form an article such as a pressure sensitive tape, are plasticized polyvinylchloride, mylar, cellulose acetate, polyethylene, polypropylene and paper.

DETAILED DESCRIPTION OF THE PREFERRED EMBODIMENTS

As exemplified in the following illustrative examples, a series of emulsion type adhesive compositions were prepared.

EXAMPLE 1

Emulsion Copolymerization of Isoprene and Sodium-Amps Monomers

A 3.0 liter well-mixed, stainless steel pressure vessel was charged with 816 grams of isoprene, and a blend of 1200 g deaerated water, 54 g sodium-lauryl-sulfate, 8.2 g dodecylthiol and 65 g of Na-AMPS (the sodium salt of 2-acrylamido-2-methylpropane sulfonic acid). The vessel was closed and purged with dry nitrogen. Later the mixing was started and the reactor temperature was set at 45° C. To initiate the reaction, 3.0 grams of potassium-persulfate (dissolved in 50 ML of water) was injected into the vessel.

After five and half hours reaction time, the reaction was stopped by discharging the reactor content into a container which 1.2 grams of hydroquinone and 120 ML water.

Copolymer Work-up

Precipitate half of the emulsion in four gallons of methanol. Dissolve 285 grams of NaCl in 1200 ML water and add it to the methanol-emulsion blend (to coagulate the emulsion). Stir blend with a large spatula and wash coagulated copolymer with water several times to extract the NaCl. "Waring blend" copolymer in fresh methanol (containing 1.0 grams of BHT stabilizer), for one half minute at high speed. Vacuum filter polymer and dry it in a vacuum oven for twenty-four hours at 50° C. Weigh polymer and send sample for analysis.

| Total weight of polymer: | 793 grams (90% conversion) |
|---|---|
| Analysis of polymer: | sulfur: 0.28 wt. % |
| | sodium: 0.16 wt. % |

0.16 wt. % of sodium is equivalent to about 1.6 wt. % Na-AMPS in the copolymer.

EXAMPLES 2-15

In the second series of experiments, emulsion were prepared in the same way as those in Example 1, except the recipe was somewhat different. In the second example, the amount of Na-AMPS was 100 grams and the chain transfer agent (dodecylthiol) was 20 grams. Other conditions were the same as in Example 1.

Results

| Total weight of polymer: | 815 grams (89% conversion) |
|---|---|
| Analysis of polymer: | sulfur: 0.70 wt % |
| | sodium: 0.23 wt. % |

0.23 wt. % of sodium is equivalent to about 2.3 wt. % of Na-AMPS in the copolymer.

Tables 1 and 2 illustrate additional examples (from 3 through 15). These examples were made in a fashion as described in detail in Example 1 and 2.

TABLE 1

| FREE RADICAL EMULSION COPOLYMERIZATION OF ISOPRENE AND Na—AMPS | | | | | | | | | | | | | |
|---|---|---|---|---|---|---|---|---|---|---|---|---|---|
| Process | Example | | | | | | | | | | | | |
| Conditions | 3 | 4 | 5 | 6 | 7 | 8 | 9 | 10 | 11 | 12 | 13 | 14 | 15 |
| Temp., °C. | 45 | 45 | 45 | 45 | 45 | 45 | 45 | 45 | 45 | 45 | 45 | 45 | 45 |
| Duration, Hours | 3 | 3 | 5 | 5 | 5 | 5 | 5 | 5 | 5 | 5 | 5 | 5 | 5 |
| Feed, Grams | | | | | | | | | | | | | |
| Isoprene | 816 | 816 | 816 | 816 | 816 | 816 | 816 | 816 | 816 | 816 | 816 | 816 | 816 |

TABLE 1-continued

FREE RADICAL EMULSION COPOLYMERIZATION OF ISOPRENE AND Na—AMPS

| Process Conditions | 3 | 4 | 5 | 6 | 7 | 8 | 9 | 10 | 11 | 12 | 13 | 14 | 15 |
|---|---|---|---|---|---|---|---|---|---|---|---|---|---|
| Water | 1200 | 1200 | 1200 | 1200 | 1200 | 1200 | 1200 | 1200 | 1200 | 1200 | 1200 | 1200 | 1200 |
| Na—Laurylsulfate | 54 | 54 | 54 | 54 | 54 | 36 | 24 | 54 | 36 | 54 | 54 | 54 | 54 |
| Dodecylthiol | 19.2 | 8.2 | 8.2 | 8.2 | 8.2 | 8.2 | 8.2 | 19.2 | 19.2 | 20 | 20 | 20 | 20 |
| K—Persulfate | 3.0 | 3.0 | 3.0 | 3.0 | 3.0 | 3.0 | 3.0 | 3.0 | 3.0 | 3.0 | 3.0 | 3.0 | 3.0 |
| Na—Acrylamido Propylsulfonate | 65 | 87 | 25 | 10 | 0 | 25 | 25 | 25 | 25 | 65 | 40 | 20 | 0 |

TABLE 2

FREE RADICAL EMULSION COPOLYMERIZATION OF ISOPRENE AND Na—AMPS
ANALYTICAL DATA AND CONVERSIONS

| Example | 3 | 4 | 5 | 6 | 7 | 8 | 9 | 10 | 11 | 12 | 13 | 14 | 15 |
|---|---|---|---|---|---|---|---|---|---|---|---|---|---|
| Total Conversion, % | 62 | 82 | 80 | 53 | 53 | 69 | 58 | 80 | 70 | 88 | 90 | 54 | 64 |
| Sulfur, wt. % | 0.74 | 0.39 | 0.30 | 0.60 | 0.58 | 0.28 | 0.37 | 0.66 | 0.60 | 0.62 | 0.53 | 0.55 | 0.74 |
| Sodium, wt. % | 0.24 | 0.15 | 0.12 | 0.40 | 0.46 | 0.15 | 0.25 | 0.32 | 1.07 | 0.26 | 0.36 | 0.31 | 0.26 |
| Na—AMPS, wt. % | 2.4 | 1.5 | 1.2 | 4.0 | — | 1.5 | 2.5 | 3.2 |  | 2.6 | 3.6 | 3.1 | — |

EXAMPLE 16

Preparation of Emulsion of Isoprene/AMPS (Na Acrylamido-Propyl Sulfonate) Copolymer and Escorez Resin Emulsions containing both isoprene/AMPS copolymer and Escorez resin tackifier can be prepared by two methods. They are:

16.1 Escorez resin (50.0 g) was dissolved into 50 ml. of toluene. Seven ml. (ca. 3.5 g polymer) of this solution were added to 10 ml. of a typical copolymer emulsion described in Examples 1 through 15 and vigorously mixed on a shaker bath for 20 minutes. A new, "stable" emulsion was evaluated for adhesive application.

16.2 Thirty ml. of an Escorez emulsion (ca. 15 g of polymer) were combined with 43 ml. of an emulsion of examples 1 through 15 (ca. 15 g of copolymer) and mixed as in Example 16.1. The new "stable" emulsion was evaluated as described.

Either of the above two methods could be employed for the preparation of adhesives and the preference of one over the other is not a critical component of the present invention.

EXAMPLE 17

Desired quantities of emulsions prepared from the above techniques were cast on a 1.5 ml thick mylar film using an adhesive draw-down blade. Wet adhesive film was experimental determined such that the adhesive film, when dried, was 1.0–1.5 mil thick. The adhesive film was dried and the resin polymer and isoprene copolymer fused by exposure to 100° C. for two minutes. Appropriate test specimens were then prepared and standard pressure sensitive adhesive tests were run. Illustrative data are shown in Table III.

TABLE III

PERFORMANCE PROPERTIES OF ADHESIVE COMPOSITIONS PREPARED FROM EMULSIONS OF ISOPRENE-SODIUM ACRYLAMIDO-PROPYL SULFONATE (AMPS) COPOLYMERS AND PETROLEUM RESIN

| Product | 136A (Example 5) | 131A[1] | Natural Rubber Latex (Typical Commercial Product) |
|---|---|---|---|
| Adhesive Composition | Isoprene/AMPS plus Escorez 1310 (50/50) | Isoprene/Nass[1] plus Escorez 1310 (~50/50) | Hartex 103 NR plus Escorez 1310 (~40/60) |
| Polyken Tack, g. | 60 | 540 | 850 |
| 90° Quick Stick, ppi | 0.7 | 1.6 | 1.6 |
| 180° Peel Strength, ppi | 2.3 | 2.4 | 1.9 |
| 178° Hold to Steel, hrs. | 0.1 | 3.4 | 8.0 |

[1]As taught in Case Number C-1484; U.S. Ser. No. 548,984, filed 11/7/83.

It can be seen that the isoprene-AMPS copolymer exhibits a promising level of peel adhesion, at least comparable to commercial natural rubber latex.

What is claimed is:

1. A water based emulsion pressure sensitive adhesive composition derived from a composition which comprises a mixture of:
   (a) an emulsion of a metal neutralized sulfonated elastomeric copolymer, said neutralized sulfonated copolymer having about 5 to about 250 meq. of neutralized sulfonated groups per 100 grams of said metal neutralized sulfonated copolymer; and
   (b) about 25 to about 200 parts by weight of a hydrocarbon tackifying resin based on a petroleum or coal tar distillate per 100 parts by weight of said metal neutralized sulfonated elastomeric copolymer, wherein said emulsion of metal neutralized sulfonated elastomeric copolymer comprises at least 80% by weight of at least one conjugated diene having from 4 to 12 carbon atoms or a combination of at least 80% by weight of at least one conjugated diene and styrene, wherein the combination contains less than 50 weight percent styrene of the total 80 weight percent and a minor proportion of a metal or amine neutralized sulfonate monomer characterized by the formula:

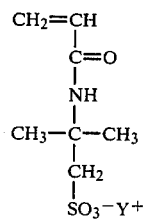 or 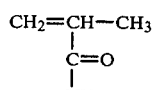

wherein $Y^+$ is a cation selected from Groups IA, IIA, IB, and IIB of the Periodic Table;

said copolymer being water insoluble, substantially gel-free, thermally stable and oxidatively stable having at least 0.5 weight percent chemically combined to less than 5 weight percent chemical combined sulfur, with a reduced viscosity as measured in a solvent at a concentration of 10 gm/liter of greater than 0.2 and less than 5.0.

2. An adhesive composition according to claim 1, wherein $Y^+$ is sodium.

3. An adhesive composition according to claim 1, wherein said conjugated diene is selected from the group consisting of 1,3-butadiene, isoprene and chloroprene and mixtures thereof.

4. An adhesive composition according to claim 1, wherein said conjugated diene is isoprene.

5. A dried pressure sensitive adhesive layer deposited on a substrate, said dried pressure sensitive layer comprising a mixture of:

(a) a metal neutralized sulfonated elastomeric copolymer, said neutralized sulfonated copolymer having about 5 to about 250 meq. of neutralized sulfonated copolymer; and (b) about 25 to about 200 parts by weight of a hydrocarbon tackifying resin based on a petroleum or coal tar distillate per 100 parts by weight of said metal neutralized sulfonated elastomeric copolymer, wherein said metal neutralized sulfonated elastomeric copolymer comprises at least 80% by weight of at least one conjugated diene having from 4 to 12 carbon atoms or a combination of at least 80% by weight of at least one conjugated diene and styrene, wherein the combination contains less than 50 weight percent styrene of the total 80 weight percent and a minor proportion of a metal or amine neutralized sulfonate monomer characterized by the formula:

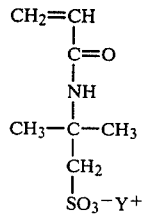 or 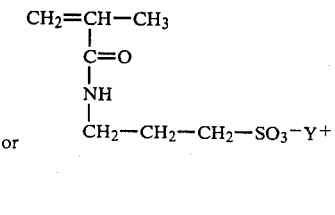

wherein $Y^+$ is a cation selected from Groups IA, IIA, IB, and IIB of the Periodic Table, said copolymer being water insoluble, substantially gel-free, thermally stable and oxidatively stable having at least 0.5 weight percent chemically combined to less than 5 weight percent chemical combined sulfur, with a reduced viscosity as measured in a solvent at a concentration of 10 gm/liter of greater than 0.2 and less than 5.0.

6. A dried pressure sensitive adhesive layer according to claim 5 wherein said conjugated diene is selected from the group consisting of 1,3-butadiene, isoprene and chloroprene and mixtures thereof.

7. A dried pressure sensitive adhesive layer according to claim 5 wherein said conjugated diene is isoprene.

8. A dried pressure sensitive adhesive layer according to claim 5 or 7 wherein $Y^+$ is sodium.

9. A dried pressure sensitive adhesive layer according to claim 5 formed by a fusion of said metal neutralized elastomeric copolymer and said hydrocarbon tackifying resin at a temperature of about 50° to about 250° C. for about 10 seconds to 10 minutes.

10. A dried pressure sensitive adhesive layer according to claim 5 wherein said substrate is selected from the group consisting of plasticized polyvinylchloride, mylar, cellulose acetate, polyethylene, polypropylene and paper.

* * * * *